(12) United States Patent
Andersson et al.

(10) Patent No.: US 7,117,761 B1
(45) Date of Patent: Oct. 10, 2006

(54) ARRANGEMENT FOR A STEERING COLUMN

(75) Inventors: Bjorn Andersson, Onsala (SE); Bjorn Antonsson, Gothenburg (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 10/148,584

(22) PCT Filed: Nov. 28, 2000

(86) PCT No.: PCT/SE00/02345

§ 371 (c)(1),
(2), (4) Date: Sep. 23, 2003

(87) PCT Pub. No.: WO01/40027

PCT Pub. Date: Jun. 7, 2001

(30) Foreign Application Priority Data

Dec. 3, 1999 (SE) .................................. 9904408-3

(51) Int. Cl.
*B62D 1/16* (2006.01)
*B60K 31/00* (2006.01)
*B60R 21/16* (2006.01)

(52) U.S. Cl. ..................... 74/492; 74/484 R; 180/170; 280/731; 439/18

(58) Field of Classification Search ............... 74/492, 74/494, 495, 489, 485, 484 R; 180/170, 180/174; 280/731; 439/18, 19, 20, 21, 22, 439/23
See application file for complete search history.

(56) References Cited

U.S. PATENT DOCUMENTS

| | | | |
|---|---|---|---|
| 4,157,854 A * | 6/1979 | Beauch ........................ 439/15 |
| 4,633,731 A * | 1/1987 | Kurata ........................ 74/492 |
| 4,674,352 A * | 6/1987 | Mizuno et al. ........... 74/484 R |
| 4,742,727 A * | 5/1988 | Mizuno et al. ........... 74/848 R |
| 4,904,190 A * | 2/1990 | Plocek et al. ................. 439/15 |
| 5,139,281 A * | 8/1992 | Dzioba ....................... 280/775 |
| 5,498,911 A | 3/1996 | Bossler et al. |
| 5,643,002 A | 7/1997 | Wolf et al. |
| 5,674,082 A | 10/1997 | Okuhara et al. |
| 5,788,278 A * | 8/1998 | Thomas et al. ............. 280/777 |
| 5,851,120 A * | 12/1998 | Sobhani ....................... 439/17 |
| 6,007,344 A * | 12/1999 | Corrunker et al. ............ 439/22 |
| 6,132,219 A * | 10/2000 | Sobhani et al. ............... 439/17 |
| 6,299,454 B1 * | 10/2001 | Henderson et al. ........... 439/19 |
| 6,331,117 B1 * | 12/2001 | Brundage .................... 439/21 |
| 6,592,148 B1 * | 7/2003 | Byers et al. ................. 280/777 |

(Continued)

FOREIGN PATENT DOCUMENTS

WO    WO 97/26154    *    7/1997

*Primary Examiner*—Richard Ridley
*Assistant Examiner*—Colby Hansen
(74) *Attorney, Agent, or Firm*—Young & Thompson

(57) ABSTRACT

A steering shaft arrangement comprises a first housing (9), which accommodates a contact roller (10), the first housing (9) being divided up into a first and second section (13, 14), of which the first section (13) is connected to a steering shaft (1) and the second section (14) is connected to a steering column (6), fixed in relation to the steering shaft (1), the contact roller (10) comprising at least one electrical conductor, which is arranged between the first and the second section (13, 14). A second housing (11) is divided up into a first and second element (19, 20) of which the first element (19) is connected to the steering shaft (1). The second element (20) of the second housing (11) is detachably connected to the second section (14) of the first housing (9).

15 Claims, 4 Drawing Sheets

U.S. PATENT DOCUMENTS 6,601,443 B1 * 8/2003 Stumpe et al. ............. 73/118.1
6,694,839 B1 * 2/2004 Landrieve .................... 74/495
6,717,320 B1 * 4/2004 Adachi et al. .............. 310/232

* cited by examiner

ARRANGEMENT FOR A STEERING COLUMN

BACKGROUND OF THE INVENTION

The present invention relates to a steering shaft arrangement comprising a first housing, which accommodates a contact roller, the first housing being divided up into a first and second section, of which the first section is connected to a steering shaft and the second section is connected to a steering column, fixed in relation to the steering shaft, the contact roller comprising at least one electrical conductor, which is arranged between the first and second section; and a second housing, which is divided up into a first and second element, of which the first element is connected to the steering shaft.

DESCRIPTION OF THE RELATED ART

A steering wheel for steering vehicles frequently has a number of switches, such as buttons for controlling horn, radio, cruise control and the like. The steering wheel also contains an airbag, which is triggered by an airbag charge. The airbag charging is controlled by an electrical signal from a sensor arranged in the vehicle. Since the steering wheel is moveable in relation to the units that are coupled to the switches and the airbag in the steering wheel, a special transmission of the electrical signals must be achieved between the moveable steering wheel and the units that are fixed in relation to the wheel. The said transmission can be achieved by means of members arranged on the steering wheel, such as brushes, which bear against slip rings, which are arranged on a steering column fixed in relation to the steering shaft. The brushes and the slip rings, however, do not permit a sufficiently rapid and reliable signal transmission for the airbag, for which reason the signal transmission to the latter is provided by a direct connection with electrical leads. In order for the electrical leads to be able to act in concert with movements of the steering wheel they are wound a number of turns around the steering shaft, which transmits movements of the steering wheel to the wheels of the vehicle. The electrical leads are furthermore encapsulated in a housing, which is arranged around the steering shaft. The vehicle may also be provided with a steering angle sensor, which supplies information to an active braking system on the steering wheel deflection and hence the steering angle of the wheels. This information is processed in the active braking system in order, for example, to increase the stability of the vehicle when braking.

A number of other components, such as a return element for an indicator stalk, arranged on the steering shaft, may also be arranged on the steering shaft.

The abovementioned components arranged on the steering shaft take up a lot of space, whilst the space on and behind the steering wheel is limited. The vehicles that are manufactured are often adapted to the customer's requirements, so that the number of such components differs from vehicle to vehicle. The components must therefore be adapted for assembly together with one another or without one another.

SUMMARY OF THE INVENTION

An object of the present invention is to produce a steering shaft arrangement, which comprises a number of components, which are adapted to one another and which can be arranged together on the steering shaft or without one another.

A further object of the invention is to produce a steering shaft arrangement, which comprises a number of components, which are adapted to one another in such a way that they take up a limited amount of space.

This is achieved by a steering shaft arrangement of the type described in the introductory part, in which the second element of the second housing is detachably connected to the second section of the first housing.

By detachably connecting the first and the second housing to one another the first housing may, if so desired, be fitted to the steering shaft together with the second housing, or the first housing alone may be fitted to the steering shaft. Connecting the first and the second to one another makes it easier to fit the housings to the steering shaft, since the housings together form one unit. At the same time the assembled unit formed by the housings takes up a small and thereby limited area, since no special connection is required between the second element of the second housing and the surrounding steering column. The fact that the first and the second housing can be detached from one another means that a number of different combinations of assembled units can be obtained.

BRIEF DESCRIPTION OF THE DRAWINGS

The invention will be explained in more detail below with the aid of examples of embodiments shown in the drawings attached, in which.

DESCRIPTION OF THE PREFERRED EMBODIMENTS

Figure 1:
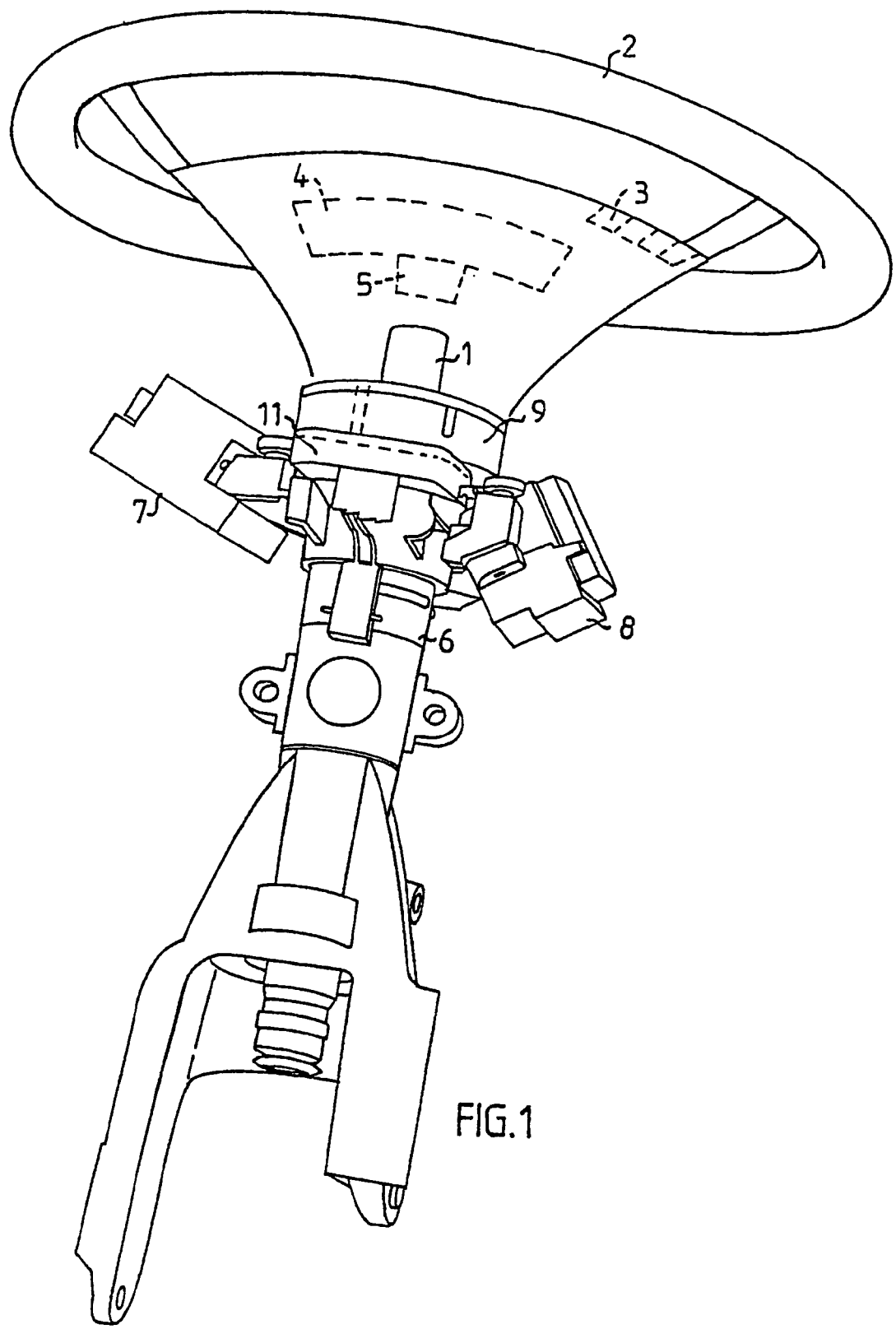
FIG. 1 is intended to show a perspective view of a steering shaft arrangement according to the present invention.

FIG. 1 shows a perspective view of a steering shaft arrangement according to the present invention. A steering wheel 2 is arranged at one end of a steering shaft 1. In the steering wheel 2 are a number of switches 3, such as buttons for controlling horn, radio, cruise-control and the like (not shown). The steering wheel 2 also contains an airbag 4, which is triggered by a bag charge 5, which has been described in the introductory part of the specification. A steering column 6 is arranged around the steering shaft 1. The steering column 6 is intended to be fitted in a vehicle (not shown). Alternatively the steering column 6 is arranged in the vehicle so that the position of the steering column 6 together with the steering shaft 1 and the steering wheel 2 can be adjusted according to a driver's wishes. Thus the steering column 6 can be firmly anchored in the vehicle, whilst the steering shaft 1 and the steering wheel 2 can be turned in relation to the steering column 6.

Control devices, such as an indicator stalk 7 for direction indicators and a stalk 8 for controlling screen wash liquid, are arranged on the steering column 6. The said stalks 7, 8 may control a number of other functions in addition to those mentioned above.

Figure 2:
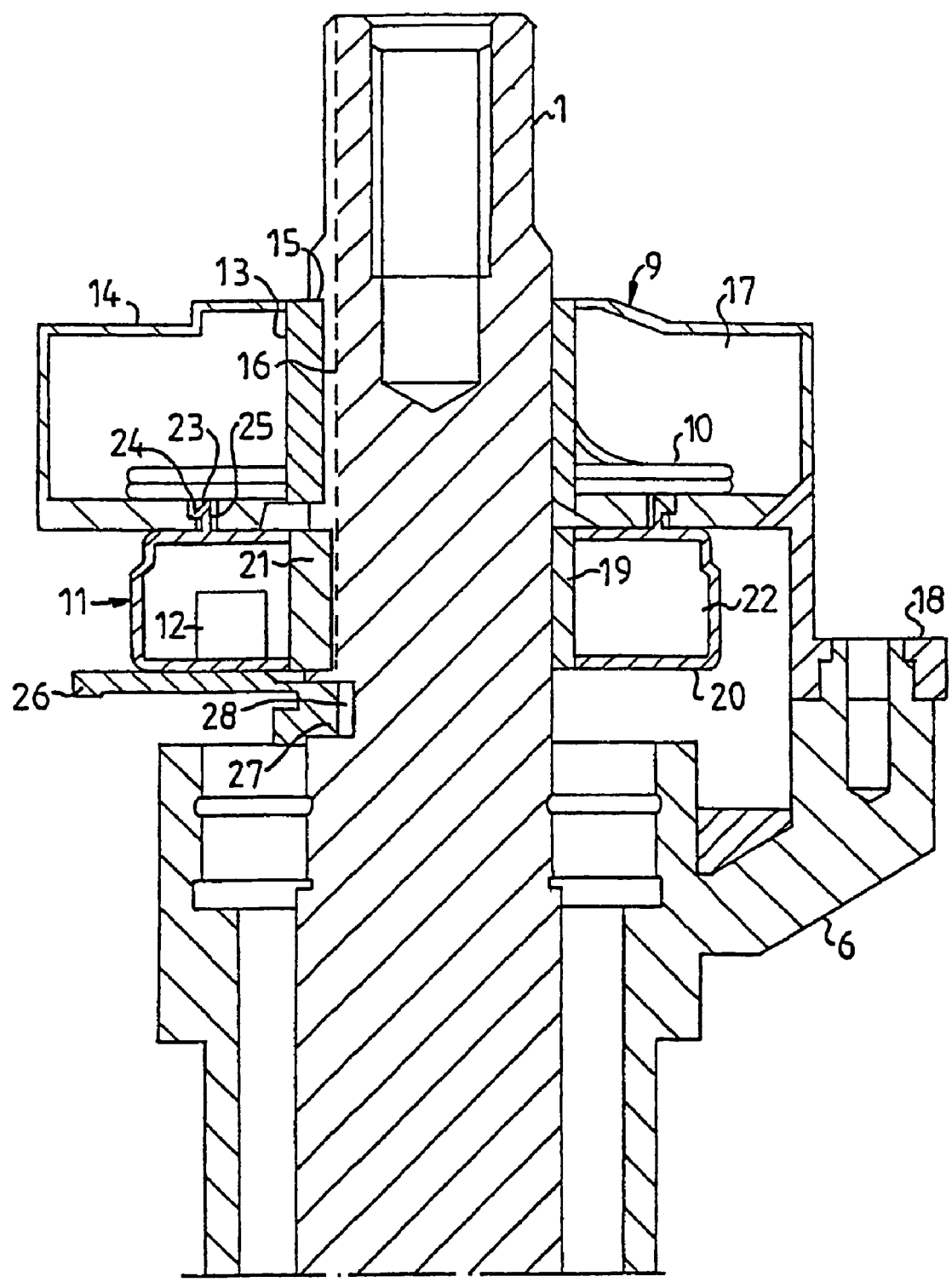
FIG. 2 is intended to show a section through a steering shaft arrangement according to a first example of an embodiment of the invention.

Since the steering wheel 2 is moveable in relation to the units that are coupled to the switches 3 and the airbag 4 in the steering wheel 2, a special transmission of the electrical signals must be achieved between the moveable steering wheel 2 and the units that are fixed in relation to the steering wheel 2, as stated in the introductory part of the specification. FIG. 2 is intended to show a sectional view through a steering shaft arrangement according to a first example of an embodiment of the invention. A first housing 9 is arranged on the steering shaft 1, which accommodates a contact roller 10 in the form of at least one electrical conductor, which transmits signals between the units and the switches 3 and the airbag 4. A second housing 11, which is detachably connected to the first housing 9, is also arranged on the steering shaft 1. The second housing 11 accommodates a steering angle sensor.

The first housing 9, which accommodates a contact roller 10, is divided up into a first section 13 and a second section 14, the first section 13 being connected to the steering shaft 1 and the second section 14 to the steering column 6. The contact roller 10, which consists of at least one electrical conductor, is arranged between the first and second section 13, 14. From the first section and second section 13, 14 the conductor or conductors extend further to respective switches 3, air bag 4 and the units that are to be controlled. The first and second section 13, 14 of the first housing 9 are thus rotatable in relation to one another. The first section 13 is essentially annular in shape and provided with a pin or projection 15, which extends into an axial groove 16 arranged in the steering shaft 1. The groove 16 may also be formed in the circumferential direction of the steering shaft 1. The second section 14 is also essentially annular in shape and together with the first section 13 defines an essentially enclosed space 17. The contact roller 10 is arranged in the said space 17. The second section 14 preferably comprises a number of attachments 18, only one of which is shown in FIG. 2. The attachments 18 connect the second section to the steering column 6.

The second housing 11 is divided up into a first element 19 and second element 20, the first element 19 being connected to the steering shaft 1. The second element 20 of the second housing 11 is arranged so that it can be connected to the second section 14 of the first housing 9. The first element 19 is essentially annular in shape and like the first section 13 of the first housing 9 is provided with a pin or a projection 21, which extends into the axial groove 16 arranged in the steering shaft 1. The second element 20 is also essentially annular in shape and together with the first element 19 defines an essentially enclosed space 22. The steering angle sensor 12 is arranged in the said space 22. The steering angle sensor 12 supplies information to an active braking system on the deflection of the steering wheel and hence the steering angle of the wheels. The function of a steering angle sensor 12 is known to the person skilled in the art and will therefore not be described in more detail here.

According to the first example of an embodiment shown in FIG. 2, a clip connector 23 is arranged for connecting the second element 20 of the second housing 11 to the second section 14 of the first housing 9. The clip connector 23 comprises at least one tongue or hook 24 arranged on the second element 20 of the second housing 11 and interacting with a recess 25 arranged in the second section 14 of the first housing 9. The tongue or hook 24 is sprung, so that it engages in the recess 25 when the first and second housings 9, 11 are brought against one another. By bringing the first and second housings 9, 11 apart with a certain force the tongue or hook 24 releases its grip on the recess 25. Making the first and second housings 9, 11 connectable in this way makes it easier to fit the housings 9, 11 to the steering shaft 1. At the same time no special attachment is required between the second section 14 and the steering column 6. Arranging the tongue or hook 24 on the second section 14 of the first housing 9, and the recess 25 in the second element 20 of the second housing 11 is also conceivable.

On the steering shaft 1 there is also a return element 26, for the indicator stalk 7 arranged on the steering shaft 1. The return element 26 is so located on the steering shaft 1 that the second housing 11, viewed in the axial direction of the steering shaft 1, is arranged between the first housing 9 and the return element 26. The return element 26 is provided with a pin or a projection 27, which is introduced into a depression 28 arranged in the steering shaft 1, so that the return element 26 is prevented from rotating in relation to the steering shaft 1. The pin or projection 27 arranged on the return element 26 may alternatively interact with the groove 16 axially arranged in the steering shaft 1.

Figure 3:
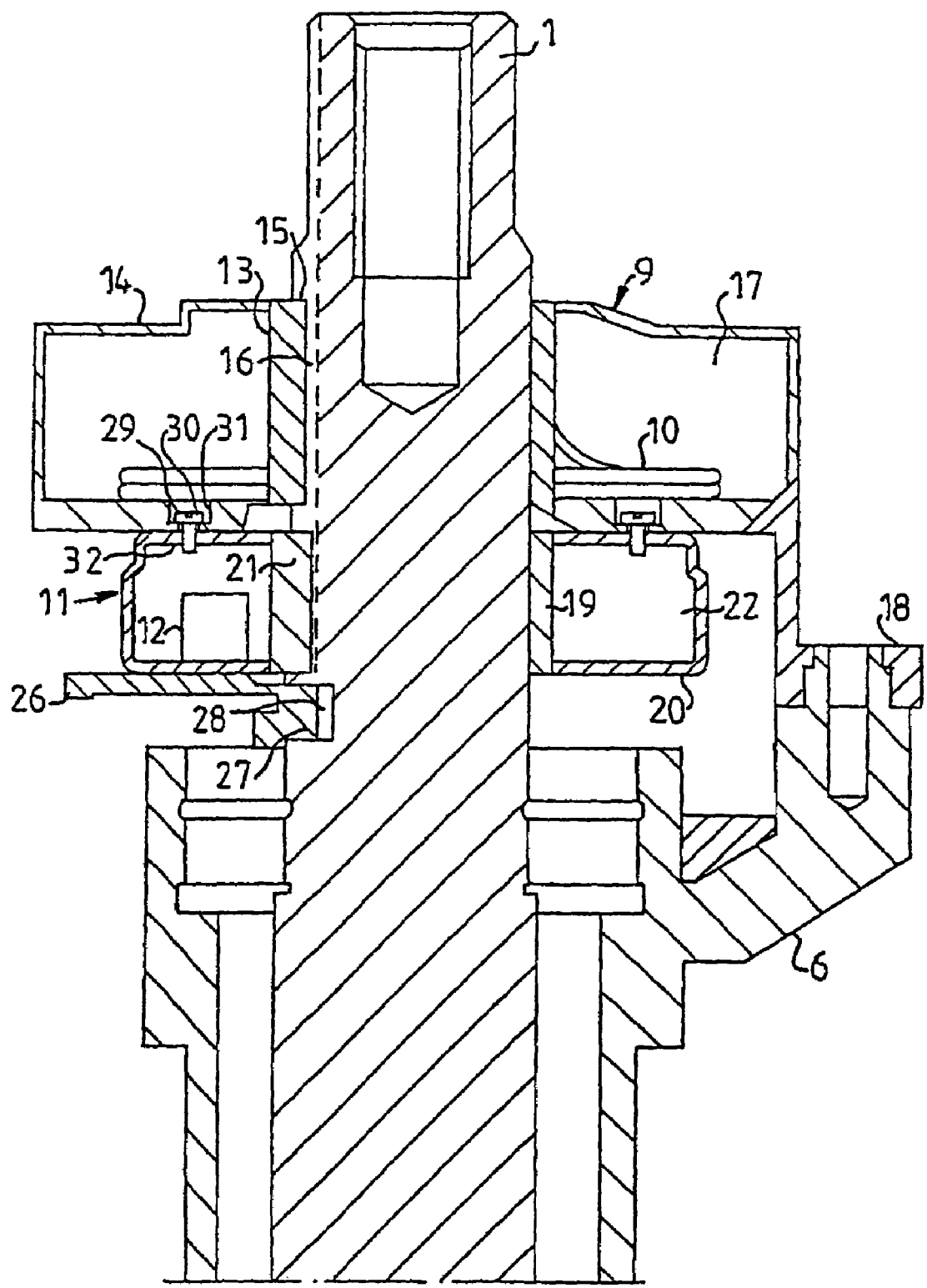
FIG. 3 is intended to show a section through a steering shaft arrangement according to a second example of an embodiment of the invention.

FIG. 3 is intended to show a sectional view through a steering shaft arrangement according to a second example of an embodiment of the invention. What distinguishes the arrangement according to the second example of an embodiment from the first example of an embodiment is the fact that a screw connector 29 is arranged for connecting the second element 20 of the second housing 11 to the second section 14 of the first housing 9. At least one screw 30 is arranged to extend through a through-hole 31 in the second section 14 of the first housing 9 and to engage with a thread, which is formed in a hole 32, arranged in the second element 20 of the second housing 11. It is possible, however, to arrange the tapped hole 32 in the second section 14 of the first housing 9 and the through-hole 31 in the second element 20 of the second housing 11.

Figure 4:
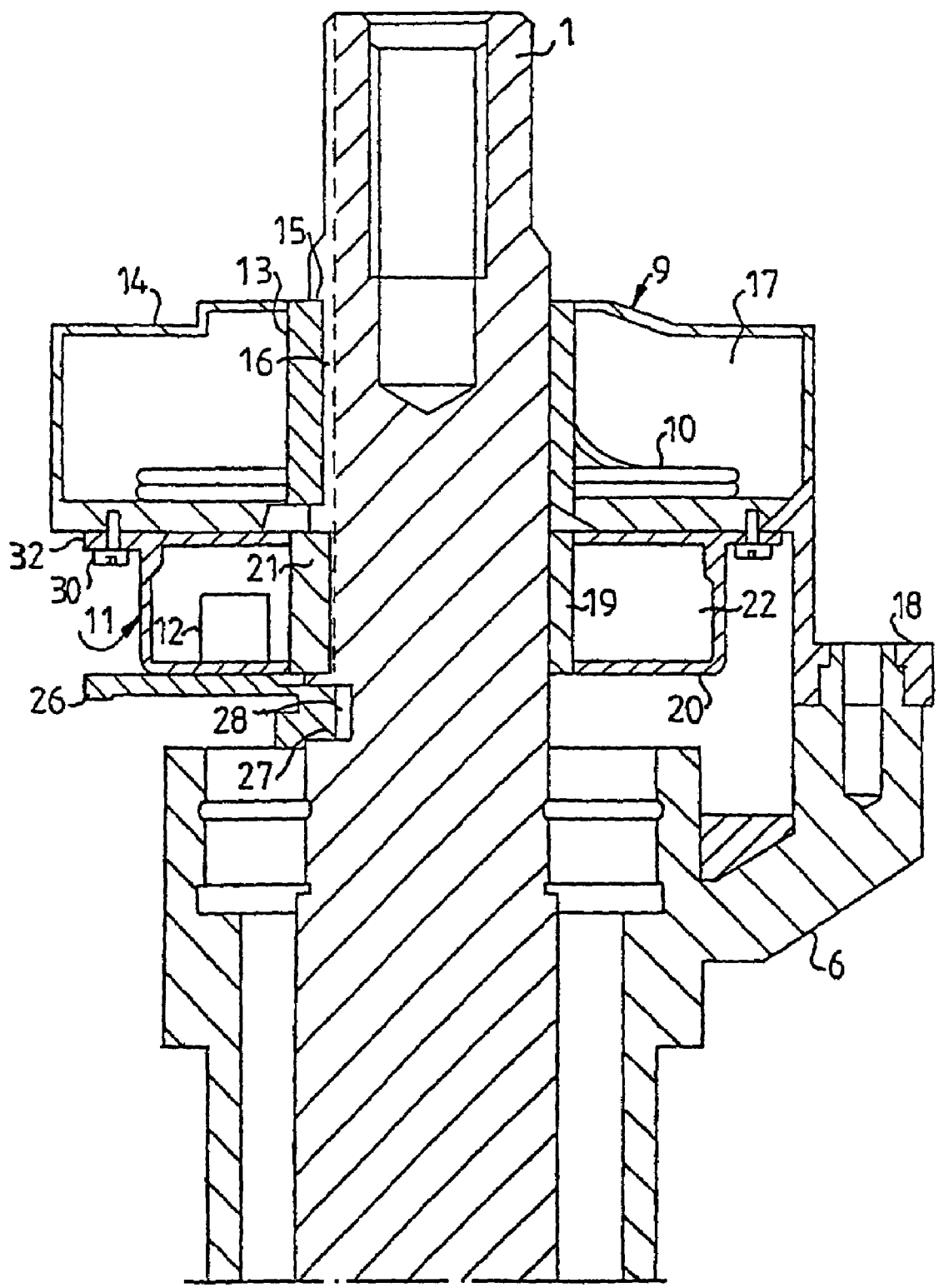
FIG. 4 is intended to show a section through a steering shaft arrangement according to a third example of an embodiment of the invention

According to a third example of an embodiment of the invention the screw connector 29 may be arranged on the outside of the housings 9, 11, as shown in FIG. 4. According to this example of an embodiment the projection 32 has been arranged on the second housing 11. The screws 30 extend through the projection 32 and further into the first housing 9.

According to the examples of embodiments above, a steering angle sensor 12 is arranged in the second housing 11. Arranging some element other than a steering angle sensor 12 in the second housing 11 is also conceivable, however.

The invention claimed is:

1. Steering shaft arrangement comprising:
   a first housing (9), the first housing (9) being divided up into a first section and a second section (13, 14), of which the first section (13) is directly connected to a steering shaft (1) and the second section (14) is directly connected to a steering column (6), fixed in relation to the steering shaft (1); and
   a second housing (11), the second housing divided up into a first element and a second element (19,20), of which the first element (19) is connected to the steering shaft (1) and the second element (20) is detachably connected to the second section (14) of the first housing (9),
   wherein, the first section is separate from the second section and the first section is movable relative to the second section.

2. Arrangement according to claim 1, characterized in that a clip connector (23) is arranged in order to connect the second element (20) of the second housing (11) to the second section (14) of the first housing (9).

3. Arrangement according to claim 1, characterized in that a screw connector (29) is arranged in order to connect the second element (20) of the second housing (11) to the second section (14) of the first housing (9).

4. Arrangement according to claim 1, characterized in that the second housing (11) accommodates a steering angle sensor (12).

5. Arrangement according to claim 1, further comprising:
- a groove (16) arranged in the steering shaft (1) on the first section (13) of the first housing (9); and
- a projection (15, 21), interacting with the groove (16), arranged the first element (19) of the second housing (11).

6. Arrangement according to claim 1, characterized in that a return element (26) for an indicator stalk (7), arranged on the steering shaft (1), is connected to the steering shaft (1), so that the second housing (11), viewed in the axial direction of the steering shaft (1), is arranged between the first housing (9) and the return element (26).

7. Steering shaft arrangement comprising:
- a first housing (9), the first housing (9) comprising a first section and a second section (13, 14), the first section (13) directly connected to a steering shaft (1) and the second section (14) directly connected to a steering column (6) in a fixed relation to the steering shaft (1), the first section and second section rotatable in relation to one another; and
- a second housing (11), the second housing comprising a first element and a second element (19,20), the first element (19) connected to the steering shaft (1) and the second element (20) detachably connected to the second section (14) of the first housing (9),
- wherein, the first section is separate from the second section and the first section is movable relative to the second section.

8. The arrangement of claim 7, wherein, the steering shaft comprises a groove, and further comprising one of a pin and a projection, provided in the first section, extending into the groove of the steering shaft.

9. The arrangement of claim 7, wherein,
- the first and second sections are each of essentially annular shape, and
- the first and second section together define an essentially enclosed first space.

10. The arrangement of claim 9, further comprising:
- attachments formed on the second section, the attachments contactingly connecting the second section to the steering column.

11. The arrangement of claim 9, wherein,
- the first and second elements are each of essentially annular shape, and
- the first and second elements together define an essentially enclosed second space.

12. The arrangement of claim 11, further comprising:
- one of a pin and projection attached to the first element and extending into the groove of the steering shaft; and
- a steering angle sensor arranged in the second space.

13. The arrangement of claim 7, further comprising:
- a clip connector (23) connecting the second element (20) of the second housing (11) to the second section (14) of the first housing (9).

14. The arrangement of claim 13, wherein,
- the clip connector comprises at last one of a tongue and hook, located on the second element of the second housing, and interacting with a recess on the second section of the first housing.

15. The arrangement according to claim 7, further comprising:
- a screw connector (29) connecting the second element (20) of the second housing (11) to the second section (14) of the first housing (9).

* * * * *